US009912538B2

(12) United States Patent
Jalan et al.

(10) Patent No.: US 9,912,538 B2
(45) Date of Patent: *Mar. 6, 2018

(54) SYNCHRONIZATION OF CONFIGURATION FILE OF VIRTUAL APPLICATION DISTRIBUTION CHASSIS

(71) Applicant: A10 Networks, Inc., San Jose, CA (US)

(72) Inventors: Rajkumar Jalan, Saratoga, CA (US); Dennis Oshiba, Fremont, CA (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,969

(22) Filed: Feb. 7, 2017

(65) Prior Publication Data

US 2017/0149606 A1 May 25, 2017

Related U.S. Application Data

(63) Continuation of application No. 14/872,937, filed on Oct. 1, 2015, now Pat. No. 9,596,134, which is a (Continued)

(51) Int. Cl.
*G06F 15/177* (2006.01)
*H04L 12/24* (2006.01)
*H04L 29/08* (2006.01)

(52) U.S. Cl.
CPC ........ *H04L 41/084* (2013.01); *H04L 41/0816* (2013.01); *H04L 67/34* (2013.01)

(58) Field of Classification Search
CPC .... H04L 41/084; H04L 41/0816; H04L 67/34
See application file for complete search history.

(56) References Cited

U.S. PATENT DOCUMENTS

| 4,475,192 A | 10/1984 | Fernow et al. |
| 5,042,032 A | 8/1991 | Dighe et al. |

(Continued)

FOREIGN PATENT DOCUMENTS

| CN | 1554055 A | 12/2004 |
| CN | 101019387 A | 8/2007 |

(Continued)

OTHER PUBLICATIONS

Parekh et al., "A generalized processor sharing approach to flow control in integrated services networks: the single node case," IEEE/ACM Trans. Networking, pp. 344-357, Jun. 1993.

(Continued)

*Primary Examiner* — Abdelnabi O Musa
(74) *Attorney, Agent, or Firm* — AMPACC Law Group, LLP; Keith Kline

(57) ABSTRACT

Methods and systems for synchronization of configuration files of a plurality of blades in a virtual application distribution chassis are disclosed. In an exemplary method, a master blade processes a configuration command, updates a first configuration file with the configuration command and generates an updated tag, and sends a configuration message to at least one slave blade of the virtual application distribution chassis informing of the updated configuration file. The configuration message is received by a given slave blade of the one or more slave blades and compared with a second configuration file stored at the given slave blade; and in response to determining that the updated tag in the configuration message is more recent than the tag in the second configuration file stored at the given slave blade, the slave blade sends a request for the updated configuration file to the master blade.

20 Claims, 7 Drawing Sheets

Related U.S. Application Data continuation of application No. 13/154,399, filed on Jun. 6, 2011, now Pat. No. 9,154,577.

(56) References Cited

U.S. PATENT DOCUMENTS

| | | | |
|---|---|---|---|
| 5,732,041 A | 3/1998 | Joffe | |
| 5,822,512 A | 10/1998 | Goodrum et al. | |
| 5,859,835 A | 1/1999 | Varma et al. | |
| 5,909,686 A | 6/1999 | Muller et al. | |
| 5,960,174 A | 9/1999 | Dew | |
| 6,047,000 A | 4/2000 | Tsang et al. | |
| 6,058,116 A | 5/2000 | Hiscock et al. | |
| 6,118,768 A | 9/2000 | Bhatia et al. | |
| 6,134,217 A | 10/2000 | Stiliadis et al. | |
| 6,314,501 B1 | 11/2001 | Gulick et al. | |
| 6,359,861 B1 | 3/2002 | Sui et al. | |
| 6,430,156 B1 | 8/2002 | Park et al. | |
| 6,438,134 B1 | 8/2002 | Chow et al. | |
| 6,470,016 B1 | 10/2002 | Kalkunte et al. | |
| 6,532,213 B1 | 3/2003 | Chiussi et al. | |
| 6,532,501 B1 | 3/2003 | McCracken | |
| 6,560,230 B1 | 5/2003 | Li et al. | |
| 6,577,596 B1 | 6/2003 | Olsson et al. | |
| 6,594,701 B1 | 7/2003 | Forin | |
| 6,650,641 B1 | 11/2003 | Albert et al. | |
| 6,654,374 B1 | 11/2003 | Fawaz et al. | |
| 6,674,721 B1 | 1/2004 | Dittia et al. | |
| 6,714,517 B1 | 3/2004 | Fawaz et al. | |
| 6,735,206 B1 | 5/2004 | Oki et al. | |
| 6,735,210 B1 | 5/2004 | Lindeborg et al. | |
| 6,765,915 B1 | 7/2004 | Metzger et al. | |
| 6,785,232 B1 | 8/2004 | Kotser et al. | |
| 6,813,268 B1 | 11/2004 | Kalkunte et al. | |
| 6,888,806 B1 | 5/2005 | Miller et al. | |
| 6,891,835 B2 | 5/2005 | Kalkunte et al. | |
| 6,892,309 B2 | 5/2005 | Richmond et al. | |
| 6,920,109 B2 | 7/2005 | Yazaki et al. | |
| 6,940,861 B2 | 9/2005 | Liu et al. | |
| 7,139,267 B2 | 11/2006 | Lu et al. | |
| 7,236,491 B2 | 6/2007 | Tsao et al. | |
| 7,353,259 B1 * | 4/2008 | Bakke | G06F 9/44505 709/208 |
| 7,421,478 B1 | 9/2008 | Muchow | |
| 7,451,221 B2 | 11/2008 | Basani et al. | |
| 7,606,867 B1 | 10/2009 | Singhal et al. | |
| 7,627,672 B2 | 12/2009 | Lai et al. | |
| 7,660,824 B2 | 2/2010 | Halpern et al. | |
| 7,673,008 B2 | 3/2010 | Kojima | |
| 7,738,504 B1 | 6/2010 | Deaner et al. | |
| 7,849,178 B2 | 12/2010 | Shen et al. | |
| 7,949,893 B1 | 5/2011 | Knaus et al. | |
| 8,122,289 B2 | 2/2012 | Sargor et al. | |
| 8,266,235 B2 | 9/2012 | Jalan et al. | |
| 8,849,938 B2 | 9/2014 | Jalan et al. | |
| 8,897,154 B2 | 11/2014 | Jalan et al. | |
| 9,154,577 B2 | 10/2015 | Jalan et al. | |
| 9,477,563 B2 | 10/2016 | Jalan et al. | |
| 9,596,134 B2 | 3/2017 | Jalan et al. | |
| 2001/0043564 A1 | 11/2001 | Bloch et al. | |
| 2002/0012348 A1 | 1/2002 | Mizuhara et al. | |
| 2002/0071387 A1 | 6/2002 | Horiguchi et al. | |
| 2002/0075875 A1 | 6/2002 | Dravida et al. | |
| 2002/0131413 A1 | 9/2002 | Tsao et al. | |
| 2003/0023898 A1 * | 1/2003 | Jacobs | H04L 29/06 714/15 |
| 2003/0133406 A1 | 7/2003 | Fawaz et al. | |
| 2003/0140132 A1 * | 7/2003 | Champagne | H04L 41/0856 709/223 |
| 2003/0158886 A1 | 8/2003 | Walls et al. | |
| 2003/0169734 A1 | 9/2003 | Lu et al. | |
| 2003/0189947 A1 | 10/2003 | Beshai | |
| 2004/0024831 A1 | 2/2004 | Yang et al. | |
| 2004/0059813 A1 | 3/2004 | Bolder et al. | |
| 2004/0228274 A1 | 11/2004 | Yazaki et al. | |
| 2004/0246980 A1 | 12/2004 | Balakrishnan | |
| 2004/0264481 A1 | 12/2004 | Darling et al. | |
| 2004/0268358 A1 | 12/2004 | Darling et al. | |
| 2005/0163049 A1 | 7/2005 | Yazaki et al. | |
| 2005/0243856 A1 | 11/2005 | Mishra et al. | |
| 2006/0101372 A1 | 5/2006 | Zhuo et al. | |
| 2006/0104230 A1 | 5/2006 | Gidwani | |
| 2006/0123479 A1 | 6/2006 | Kumar et al. | |
| 2006/0164987 A1 | 7/2006 | Ruiz Floriach et al. | |
| 2006/0206594 A1 | 9/2006 | Brown et al. | |
| 2007/0081527 A1 | 4/2007 | Betker et al. | |
| 2007/0086428 A1 | 4/2007 | Lai et al. | |
| 2008/0104215 A1 * | 5/2008 | Excoffier | H04L 67/1095 709/223 |
| 2009/0204699 A1 | 8/2009 | Kortright | |
| 2010/0049836 A1 | 2/2010 | Kramer | |
| 2010/0094967 A1 | 4/2010 | Zuckerman et al. | |
| 2010/0162036 A1 | 6/2010 | Linden et al. | |
| 2011/0066672 A1 | 3/2011 | Zamarreno et al. | |
| 2011/0161405 A1 * | 6/2011 | He | H04L 41/0803 709/203 |
| 2012/0179770 A1 | 7/2012 | Jalan et al. | |
| 2012/0281540 A1 | 11/2012 | Khan et al. | |
| 2012/0297240 A1 | 11/2012 | Jalan et al. | |
| 2012/0311116 A1 | 12/2012 | Jalan et al. | |
| 2013/0151686 A1 | 6/2013 | Takaoka et al. | |
| 2015/0039674 A1 | 2/2015 | Agarwal et al. | |
| 2015/0195182 A1 | 7/2015 | Mathur et al. | |
| 2015/0312322 A1 | 10/2015 | Kamat et al. | |
| 2016/0020947 A1 | 1/2016 | Jalan et al. | |
| 2016/0062855 A1 | 3/2016 | Jalan et al. | |
| 2017/0013051 A1 | 1/2017 | Jalan et al. | |

FOREIGN PATENT DOCUMENTS

| | | |
|---|---|---|
| CN | 101252506 A | 8/2008 |
| CN | 101519078 A | 9/2009 |
| CN | 102708004 A | 10/2012 |
| CN | 102984194 A | 3/2013 |
| EP | 2663919 A2 | 11/2013 |
| HK | 1183571 A | 12/2013 |
| HK | 1186802 A | 3/2014 |
| JP | H06044090 A | 2/1994 |
| JP | 2002278787 A | 9/2002 |
| JP | 2003345640 A | 12/2003 |
| JP | 2007257023 A | 10/2007 |
| JP | 2009003923 A | 1/2009 |
| JP | 5948345 B2 | 7/2016 |
| TW | 542960 B | 7/2003 |
| TW | I233734 B | 6/2005 |
| TW | I277324 B | 3/2007 |
| WO | WO2010077222 A1 | 7/2010 |
| WO | WO2012097015 A2 | 7/2012 |
| WO | WO2012170226 A2 | 12/2012 |
| WO | WO2015164027 A1 | 10/2015 |

OTHER PUBLICATIONS

Bennett et al., "WF²Q: Worst-case fair weighted fair queueing," Proc. IEEE INFOCOM '96, pp. 120-128 San Francisco, CA, Mar. 1996.

Golestani, S.J., "A self-clocked fair queueing scheme for broadband applications," Proc. INFOCOM '94, pp. 636-646, Jun. 1994.

Zhang, L. "Virtual Clock: A new traffic control algorithm for packet-switched networks," ACM Trans. On Computer Systems, vol. 9, No. 2, pp. 101-124, May 1991.

Shreedhar et al., "Efficient fair queuing using deficit round-robin," IEEE/ACM Trans. Networking, vol. 4, No. 3, pp. 375-385, Jun. 1996.

Stiliadis et al., "Efficient fair queueing algorithms for packet-switched networks," IEEE/ACM Trans. Networking, vol. 6, No. 2, pp. 175-185, Apr. 1998.

Suri et al., "Leap forward virtual clock: a new fair queuing scheme with guaranteed delays and throughput fairness," Proc. INFOCOM '97, pp. 557-565, Apr. 1997.

(56) References Cited

OTHER PUBLICATIONS

Stiliadis et al., "Latency-rate servers: a general model for analysis of traffic scheduling algorithms," IEEE/ACM Trans. Networking, vol. 6, No. 5, pp. 611-624, Oct. 1998.
Matsufuru et al. "Efficient fair queueing for ATM networks using uniform round robin," Proc. INFOCOM '99, pp. 389-397, Mar. 1999.
Katevenis et al., "Weighted round-robin cell mutliplexing in a general-purpose ATM switch chip," IEEE Journal on Selected Areas in Communication, vol. 9, No. 8, pp. 1265-1279, Oct. 1991.
Chaskar et al., "Fair scheduling with tunable latency: A Round Robin approach," IEEE Globecom '99, pp. 1328-1333, Dec. 1999.
Bennett et al., "High speed, scalable, and accurate implementation of packet fair queueing algorithms in ATM networks," Proc. ICNP '97, pp. 7-14, Oct. 1997.
Nageshwara Rao et al., "Concurrent access of priority queues," IEEE Trans. On Computers, vol. 37, No. 12, pp. 1657-1665, Dec. 1998.
Rexford et al., "Hardware-efficient fair queueing architectures for high-speed networks," Proc. INFOCOM '96, pp. 638-646, Mar. 1996.

\* cited by examiner

SYNCHRONIZATION OF CONFIGURATION FILE OF VIRTUAL APPLICATION DISTRIBUTION CHASSIS

CROSS-REFERENCE TO RELATED APPLICATIONS

The present application is a continuation of, and claims the priority benefit of, U.S. Nonprovisional patent application Ser. No. 14/872,937, filed Oct. 1, 2015, titled "Synchronization of Configuration File of Virtual Application Distribution Chassis", which in turn is a continuation of U.S. Nonprovisional patent application Ser. No. 13/154,399, filed Jun. 6, 2011, titled "Synchronization of Configuration File of Virtual Application Distribution Chassis", now U.S. Pat. No. 9,154,577, issued on Oct. 6, 2015. The disclosure of the above application is hereby incorporated by reference in its entirety, including all references cited therein.

FIELD

This invention relates generally to data communications, and more specifically, to a virtual cluster system.

BACKGROUND

Web services and cloud computing are deployed in an unprecedented pace. New servers are unloaded and installed at datacenters every day. Demands of web services and corporate computing come from many market segments. Consumer oriented services include mobile apps such as iPhone™ apps, iPad™ apps, Android™ apps, mobile applications such as location based services, turn-by-turn navigation services, e-book services such as Kindle™, video applications such as YouTube™ or Hulu™, music applications such as Pandora™ or iTunes™, Internet television services such as Netflix™, and many other fast growing consumer Web services. On the corporate front, cloud computing based services such as Google™ docs, Microsoft™ Office Live and Sharepoint™ software, Salesforce.com™'s on-line software services, tele-presence and Web conferencing services, and many other corporate cloud computing services.

More and more servers are deployed to accommodate the increasing computing needs. These servers are typically managed by service controllers such as server load balancers (SLB) or application delivery controllers (ADC). These controllers manage the load balancing and delivery of service sessions from client host computers to servers. As more servers are deployed, more controllers are deployed accordingly. These network controllers can be pooled together for several significant purposes—to provide scalable services and solutions when dealing with large number of users; to offer high availability of service when dealing with possible unscheduled or scheduled unavailability of a server; to help ease the complexity of administration and management of a larger number of controllers. The controllers in a cluster pool work in tandem with each other in order to provide a consistent service to the users. If there is a configuration change to a controller in a cluster, the change can have a significant adverse effect on operation of other controllers in the cluster if the change conflicts with existing configurations of these controllers. Often, the totality of existing configuration of the cluster is recorded in a configuration file. All controllers in the cluster must adhere to the configuration according to the configuration file for proper operation of the controllers in the cluster. When there is a change of configuration, the configuration file must be updated to include the change. A new configuration file combining the new configuration change and the existing configuration file becomes the most recent configuration file. The new configuration file is to be informed to all controllers in the cluster. If one controller in the cluster becomes unavailable and available again, the newly available controller needs to apply the configuration in the new configuration file in order to work in tandem with other controllers in the cluster.

Therefore, there is a need for a method for a virtual chassis system to synchronize a configuration file in the cluster of controllers.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a method for synchronizing configuration files by a master blade of a virtual application distribution chassis comprising a plurality of blades, comprises: processing a configuration command received from an administrative host by the master blade; determining that the received configuration command applies changes to at least one network application implemented by one or more blades of the virtual application distribution chassis; updating a first configuration file with the received configuration command and generating an updated tag associated with the updated first configuration file, the updated first configuration file comprising the received configuration command; sending a first configuration message to one or more slave blades of the plurality of blades informing of the updated configuration file; in response to the configuration message informing the one or more slave blades of the updated configuration file, receiving a request for the updated configuration file from at least one slave blade; and sending a second configuration message comprising the updated first configuration file and updated tag.

In one aspect of the present disclosure, the processing a configuration command received from an administrative host by the master blade comprises identifying at least one slave blade from the plurality of blades in the virtual application distribution chassis for the configuration command.

In various aspects of the present disclosure, the updated tag is a time stamp, integer, or revision number.

In various embodiments, the master blade of the virtual application distribution chassis is a server load balancer or application delivery controller.

System and computer readable storage medium corresponding to the above-summarized methods are also described and claimed herein.

BRIEF DESCRIPTION OF THE SEVERAL VIEWS OF THE FIGURES

Embodiments are illustrated by way of example and not by limitation in the figures of the accompanying drawings, in which like references indicate similar elements.

DETAILED DESCRIPTION

Figure 1:
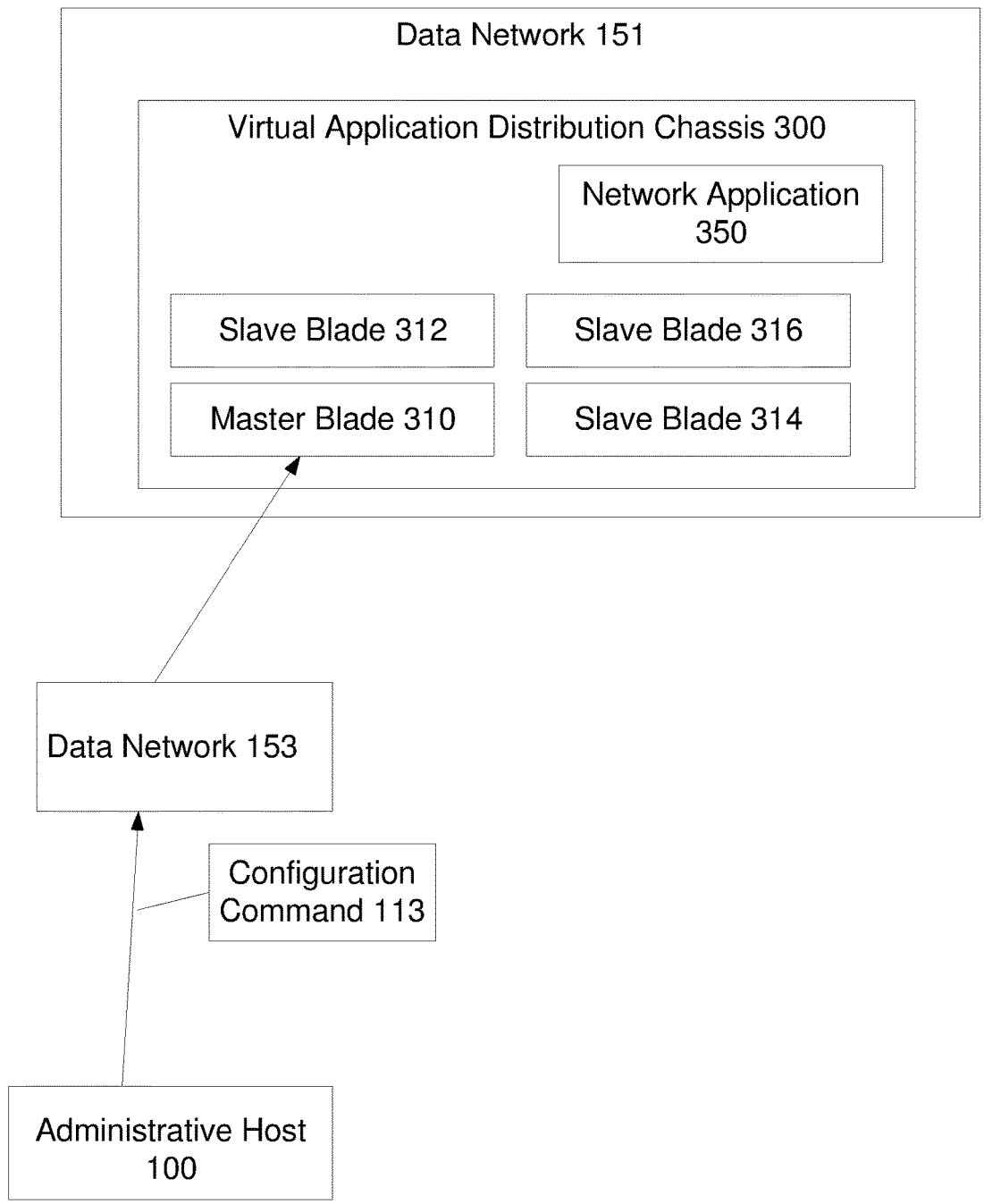
FIG. 1 illustrates an exemplary embodiment of a virtual application distribution chassis connecting to an administrative host computer.

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an exemplary embodiment of a virtual application distribution chassis 300 managed by an administrative host 100. The administrative host 100 may also be referred to herein as host 100.

Figure 2:
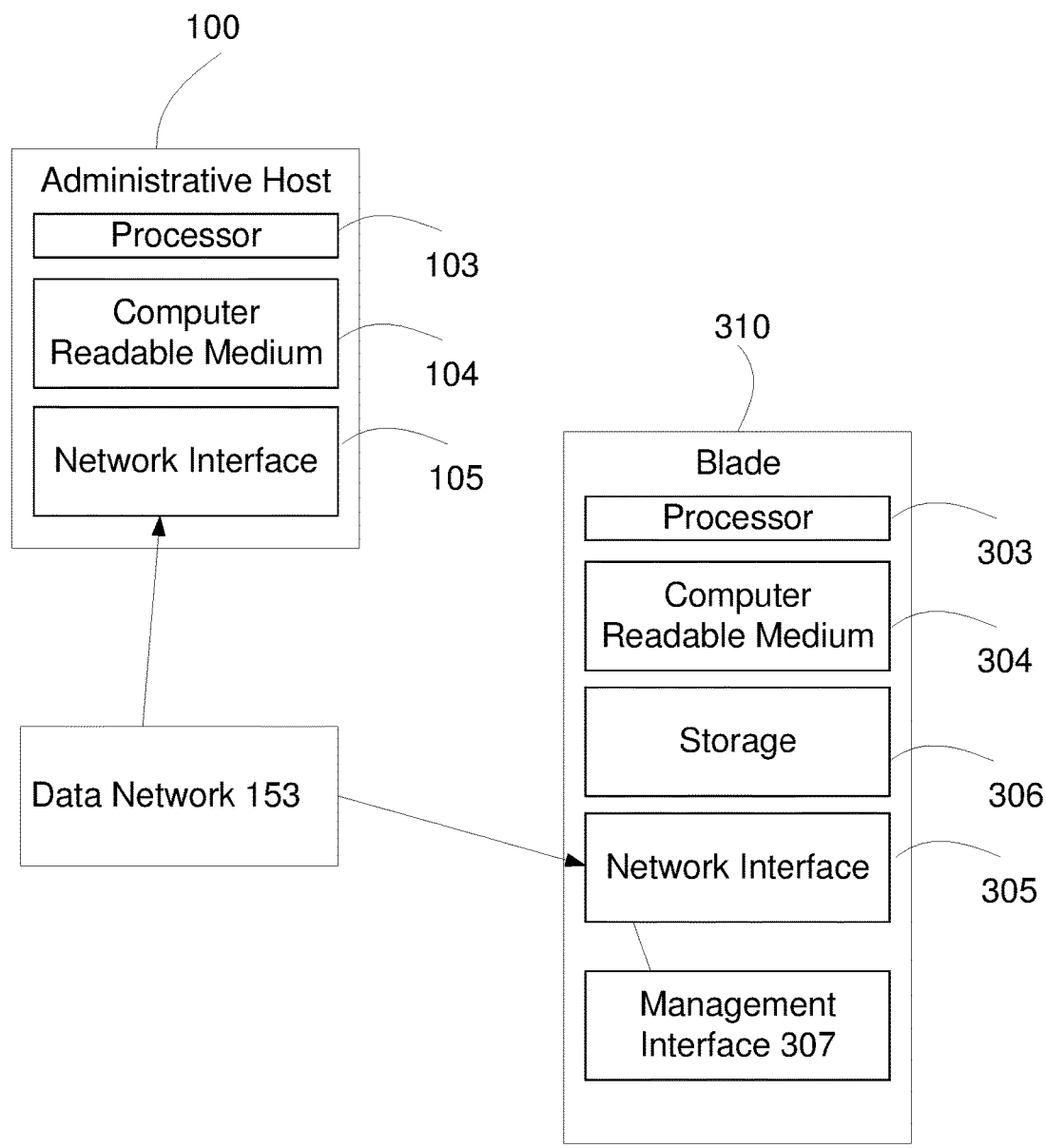
FIG. 2 illustrates components of an exemplary embodiment of a virtual application distribution chassis.

Administrative host 100 is a computing device with network access capabilities. As shown in FIG. 2, the host 100 is operationally coupled to a processor 103, a computer readable medium 104 and a network interface 105. The computer readable medium 104 stores computer program code executable by the processor 103. The network interface 105 connects to data network 153. Examples of network interface 105 include Ethernet, WiFi, mobile network interface, Bluetooth, WiMAX, digital subscriber line (DSL), cable interface, broadband network interfaces such as T1 or T3, optical network interfaces, wireless network interfaces or other data network interfaces. In one embodiment, host 100 is a workstation, a desktop personal computer or a laptop personal computer. In one embodiment, host 100 is a Personal Data Assistant (PDA), a smartphone, a tablet, or a cellular phone.

In FIG. 1, the virtual application distribution chassis 300 includes a plurality of blades such as blade 310, blade 312, blade 314 and blade 316. Each blade, for example blade 310, as illustrated in FIG. 2, is operationally coupled to a processor 303, a computer readable medium 304 and a network interface 305. The computer readable medium 304 stores computer readable program code, which when executed by the processor 303, implements the various exemplary embodiments as described herein. Returning to FIG. 1, in one embodiment, virtual application distribution chassis 300 implements at least a network application 350, such as a server load balancing application, an application delivery controlling application, a service delivery application, a traffic managing application, a security gateway application, a component of a firewall system, a component of a virtual private network (VPN), a load balancer for video servers, or a service gateway to distribute load to a plurality of servers. The network application 350 is implemented by one or more blades of virtual application distribution chassis 300. In one embodiment, the network application 350 is implemented by all the blades of virtual application distribution chassis 300. In one embodiment, the network application 350 is implemented by one or more, but not all, blades of virtual application distribution chassis 300. The network interface 305 (FIG. 2) connects to data network 153. In FIG. 1, blades 310, 312, 314, 316 form the virtual application distribution chassis 300 through their connections to the data network 151. In one embodiment, data network 151 connects virtual application distribution chassis 300 to data network 153. In one embodiment, data network 151 includes data network 153. In one embodiment, data network 151 resides in a data center, spans across multiple data centers over a wide area network such as optical network, or spreads over multiple buildings in a campus area network.

Blade 310 includes storage 306 (FIG. 2) to store various data necessary for the execution of the program code stored in the computer readable medium 304, as well as other data. In one embodiment, storage 306 includes a memory module, a hard disk, a solid state disk, a flash memory module, a dynamic memory module, a memory cache, or a removable memory module, such as a removable hard disk or flash memory drive.

Assume that blade 310 is the master blade of the virtual application distribution chassis 300. Master blade 310 additionally includes management interface 307, as illustrated in FIG. 2. Master blade 310 uses management interface 307 to communicate with administrative host 100. Management interface 307 is a network interface connecting to data network 153. In one embodiment, network interface 305 and management interface 307 reside on the same network card. In one embodiment, management interface 307 resides in a different network card from network interface 305.

In FIG. 1, administrative host 100 sends a configuration command 113 to master blade 310 using data network 153. Master blade 310 receives the configuration command 113 over management interface 307. In this embodiment, configuration command 113 is applied to configure one or more blades of virtual application distribution chassis 300. For example, configuration command 113 configures network interface of blade 314 such as setting up an Ethernet address, an IP address, of an Ethernet port of blade 314. In another example, configuration command 113 configures a buffer size in the network interface of blade 312.

In another embodiment, configuration command 113 is applied to configure a network application 350 of virtual application distribution chassis 300. For example, the network application 350 is a server load balancing application, and configuration command 113 sets up a server load balancer policy for a server. In one example, the network application 350 is a network traffic management application, and configuration command 113 configures a quality of service parameters for the traffic management application. In another example, the network application 350 is a VPN firewall application, and configuration command 113 configures a company user account for the VPN access. In another example, the network application 350 is a high availability service for another network application, and configuration command 113 configures the high availability service.

In one embodiment, the network application configuration command 113 applies to all the blades, when the network application 350 is implemented by all the blades. In one embodiment, the network application configuration command 113 applies to one or more of the blades implementing the network application 350.

Data network 153 connects the host 100 and the virtual application distribution chassis 300, also referred to as virtual cluster system 300. In various embodiments, data network 153 is an Internet Protocol (IP) network, a corporate data network, a regional corporate data network, an Internet service provider network, or a residential data network. Data network 153 includes a wired network such as Ethernet, and/or a wireless network such as a WiFi network, or cellular network.

Data network 151 connects virtual cluster system 300 to data network 153. In one embodiment, data network 151 resides in a data center, spans across multiple data centers over a wide area network such as optical network, or spreads over multiple buildings in a campus area network.

Figure 3:
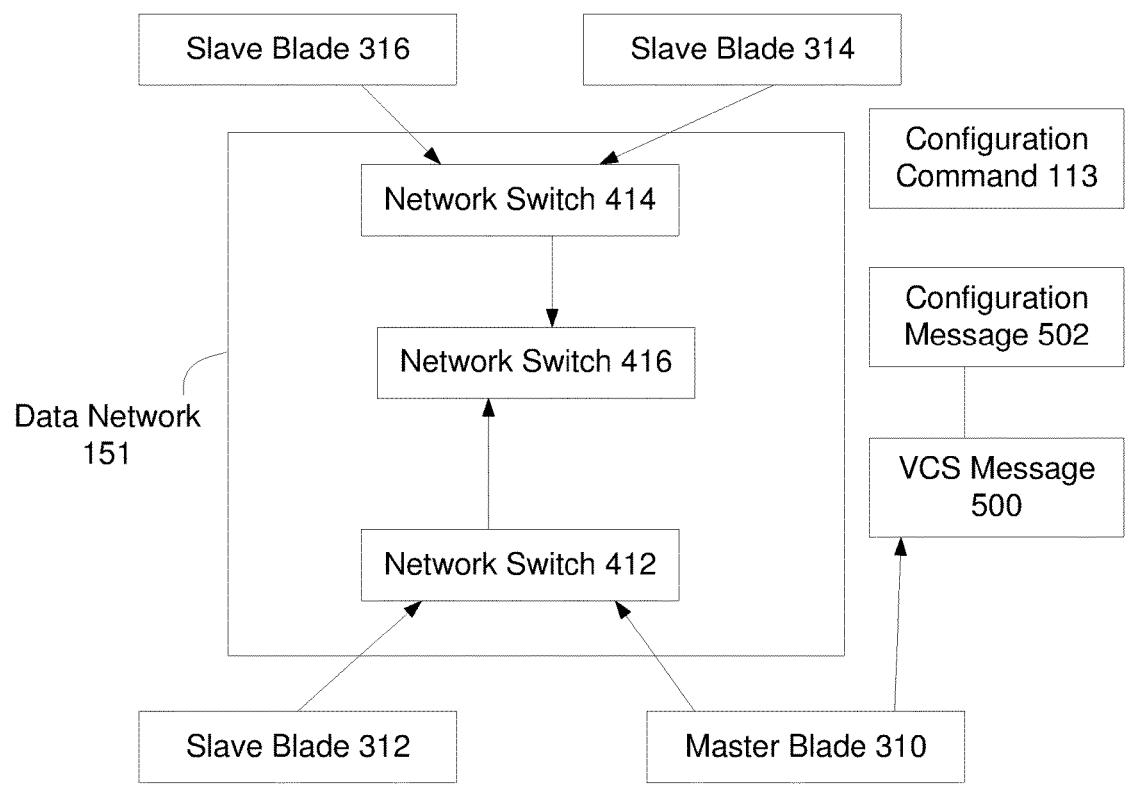
FIG. 3 illustrates connectivity of blades in an exemplary embodiment of a virtual application distribution chassis.

FIG. 3 illustrates connectivity of the blades of an embodiment of a virtual application distribution chassis according to the present invention. In this embodiment, blade 310 is a separate piece of hardware from the other blades. Blade 310 connects to the other blades 312, 314, and 316 over data network 151. In one embodiment, data network 151 includes a plurality of network switches such as switch 414, switch 412 and switch 416. Network switch 412 or network switch 414 is a networking device connecting a plurality of blades and network switches. In one embodiment, switch 412 is an Ethernet switch, an IP router, an optical network switch, WAN network equipment, an ATM switch, a MPLS switch, a layer-2 network switch/hub/bridge, or a layer-3 network switch/router. In the embodiment illustrated in FIG. 3, switch 412 connects blade 312, blade 310 and switch 416; switch 414 connects blades 314, blade 316 and switch 416. In this embodiment, blade 312 communicates with blade 310 using switch 412, and with blade 316 using switches 412, 416, and 414.

In one embodiment, switches 412, 414, and 416 reside in a same physical location, such as a data center. In one embodiment, switches 412, 414, and 416 reside in different locations, such as in two or more data centers. Assume that in this embodiment, blades 310, 312, 314 and 316 reside in different data centers.

Blade 310 communicates with the other blades by sending and receiving a virtual cluster system (VCS) message 500. In one embodiment blade 310 sends virtual cluster system message 500 using a broadcast network address such as an Ethernet broadcast address. In one embodiment, virtual cluster system message 500 uses a multicast address, such as an Ethernet multicast address, an IP multicast address, or other multicast network address. In one embodiment, blade 310 establishes a communication session (not shown) with blade 312 and sends virtual cluster system message 500 to blade 312 using the communication session. Blade 310 establishes a separate communication session with each of the other blades to send virtual cluster system message 500 to the other blades. Examples of the communication session include an UDP session, a TCP session, an IP-based communication session, a peer-to-peer communication session, a unicast communication session or other form of data communication session. In one embodiment, blade 310 receives virtual cluster system message 500 using a broadcast, a multicast address or a communication session with blade 312 or one of the other blades.

In one embodiment, blade 310 sends and receives a configuration message 502 which is a type of virtual cluster system message 500. Configuration message 502 communicates a configuration command 113 to the receiving blades. The configuration command 113 in the configuration message 502 may be the actual configuration command sent by the host 100, or may instead be a command which implements the host's configuration command at the receiving slave blade.

Figure 4:
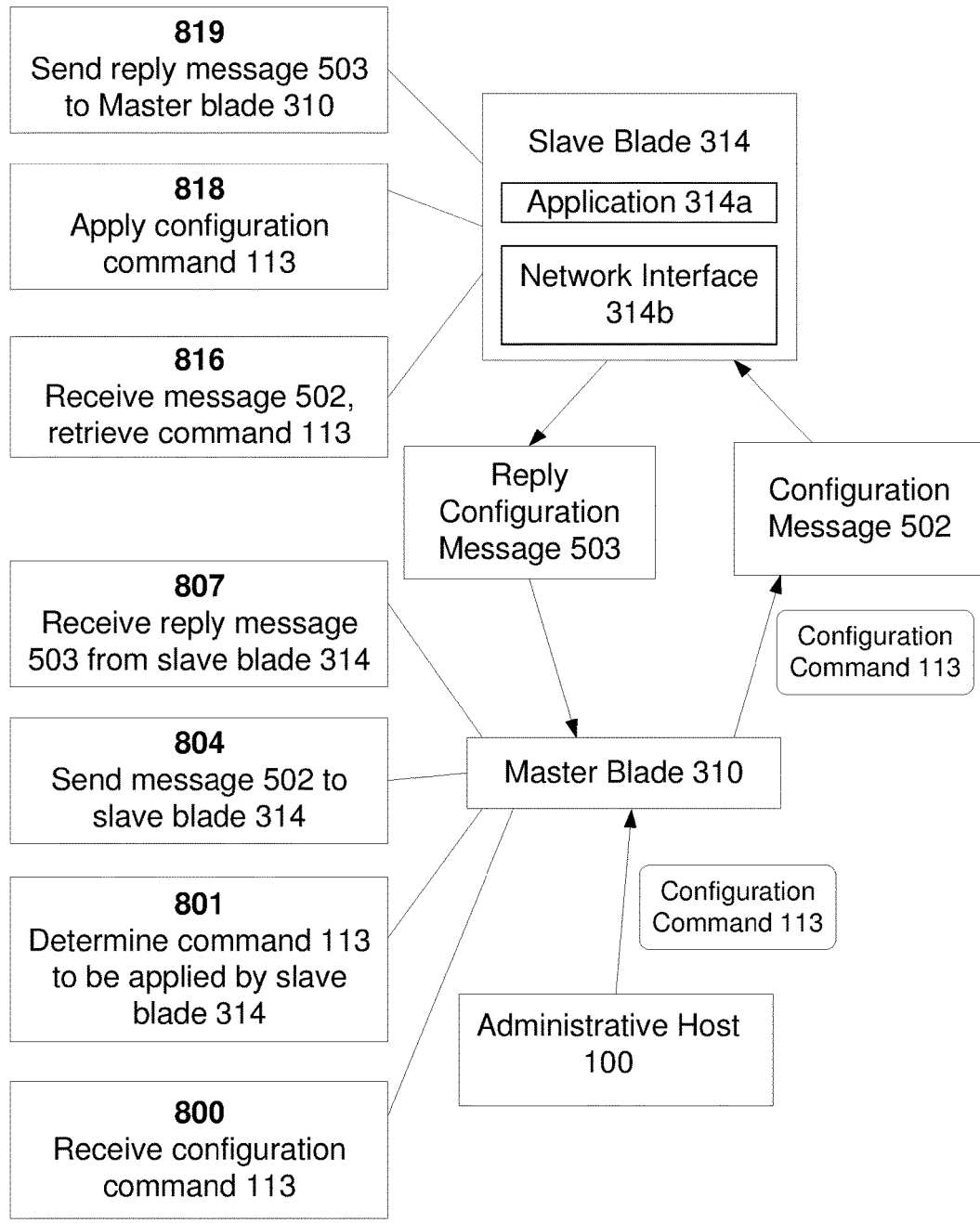
FIG. 4 illustrates a virtual application distribution chassis processing a configuration command according to an exemplary embodiment.

FIG. 4 illustrates virtual application distribution chassis 300 processing a configuration command 113 according to an embodiment of the present invention. Administrative host 100 sends configuration command 113 to virtual cluster system 300.

Master blade 310 of virtual cluster system 300 receives configuration command 113 from administrative host 100 (800). Master blade 310 determines that configuration command 113 is to be applied by one or more slave blades. For purposes of illustration, assume that master blade 310 determines that configuration command 113 is to be applied by slave blade 314 (801). In one embodiment, administrative host 100 specifies an identity of blade 314 in configuration command 113. In one scenario, configuration command 113 is a configuration of a network interface of blade 314. Administrative host 100 includes blade 314 identity in configuration command 113. Master blade 310 determines that the configuration command 113 is to be applied by blade 314 from the blade 314 identity in configuration command 113. In one embodiment, configuration command 113 includes an identity of the network interface. Master blade 310 determines that the configuration command 113 is to be applied by blade 314 using the network interface identity in configuration command 113. In one embodiment, master blade 310 stores in storage 306 a plurality of network interface identities and identities of the blades in virtual application distribution chassis 300, where each network interface identity is associated with a blade identity. Master blade 310 matches the network interface identity with the plurality of network interface identities in storage 306. Master blade 310 obtains the blade identity of the matching network interface in the storage module 306.

In one embodiment, configuration command 113 applies to network application 350 which is to be applied by all of the blades implementing network application 350. Master blade 310 determines based on configuration command 113 that all of these blades are to apply the configuration command 113. In one embodiment, master blade 310 stores in storage 306 a plurality of configuration commands which are applicable to all of these blades. Master blade 310 matches configuration command 113 with one or more of the plurality of configuration commands in storage 306 and determines that the configuration command 113 is to be applied by all of these blades. For this embodiment, the processing of the configuration command 113 by the master blade 310 with blade 314 is repeated for each of the other blades of the virtual application distribution chassis 300.

In one embodiment, configuration command 113 includes an identity of blade 314 and a configuration for network application 350. Master blade 310 determines that the configuration command 113 is to be applied by blade 314 based on the blade 314 identity from configuration command 113.

In response to determining that the configuration command 113 is to be applied by blade 314, master blade 310 sends a configuration message 502 to slave blade 314 (804). In various embodiments, master blade 310 includes configuration command 113 in configuration message 502. The configuration message 502 is delivered to slave blade 314 is as described above with reference to FIG. 3. Slave blade 314 receives configuration message 502 and retrieves configuration command 113 (816). Slave blade 314 applies a configuration or change according to configuration command 113 (818). Configuration command 113 may apply to the network interface 314b of slave blade 314 or an implementation of a network application 314a by slave blade 314. After slave blade 314 completes the application of the configuration command 113, slave blade 314 replies to master blade 310 (819). Slave blade 314 sends a reply configuration message 503 as a response to master blade 310 to indicate that the configuration command 113 has been applied by blade 314. Master blade 310 receives the reply configuration message 503 in step 807 from slave blade 314 (807).

Figure 5:
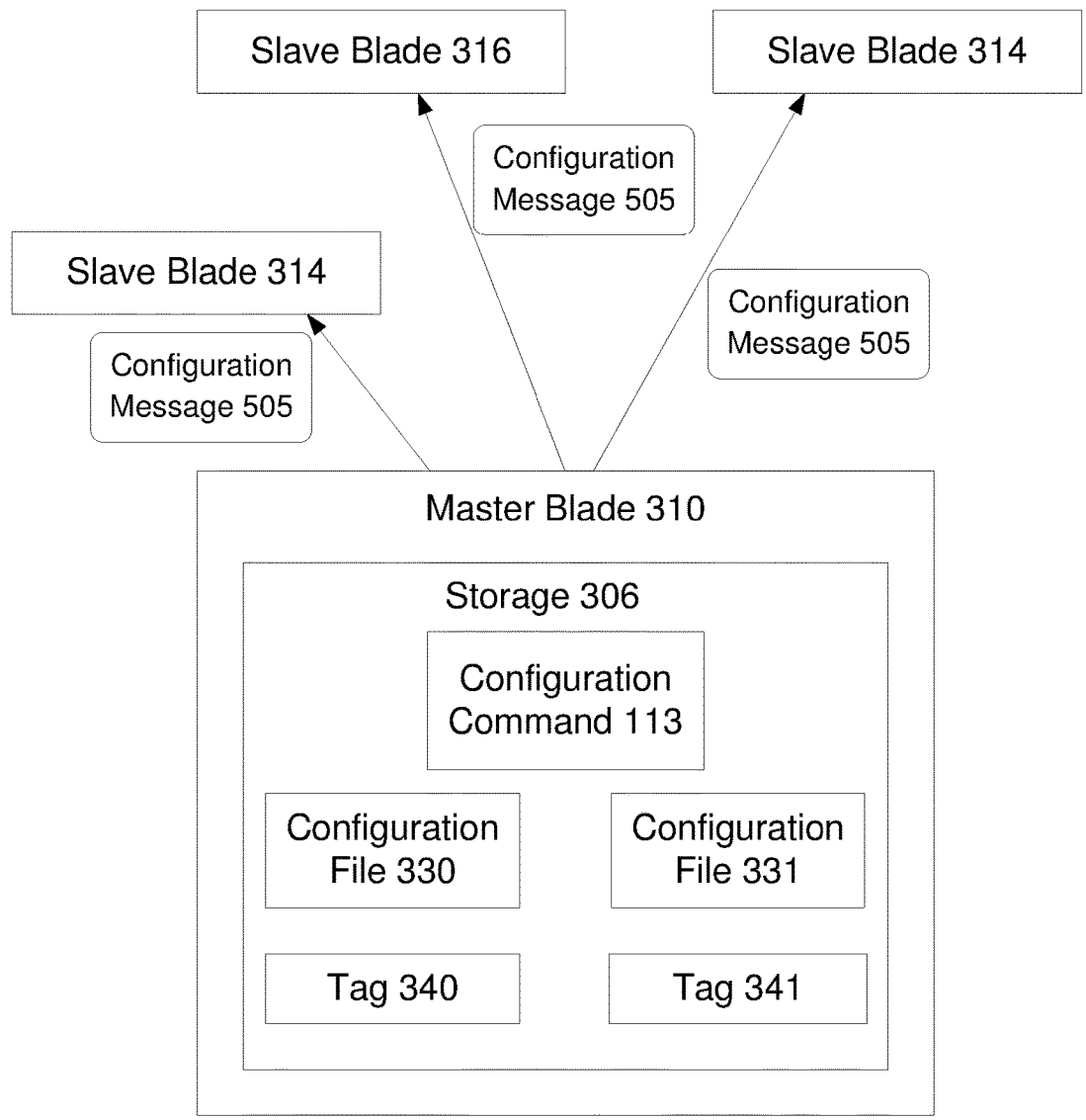
FIG. 5 illustrates a master blade updating a configuration file after processing a configuration command according to an exemplary embodiment.

FIG. 5 illustrates a master blade updating a configuration file after processing a configuration command according to an embodiment of the present invention. Master blade 310 includes storage 306. Storage 306 includes a most recent configuration file 330. Configuration file 330 includes a plurality of configuration commands recently received and processed by virtual application distribution chassis 300. Upon completing processing configuration command 113, master blade 310 updates configuration file 330 to configuration file 331, which includes configuration commands of configuration file 330 and configuration command 113. Configuration file 331 is more recent than configuration file 330. In various embodiments, master blade 310 replaces configuration file 330 with configuration file 331, or archives configuration file 330 to a different location in storage 306. For example, master blade 310 changes the file name of configuration file 330. Configuration file 331 becomes the most recent configuration file. In order to distinguish configuration file 331 as more recent than configuration file 330, configuration file 330 includes a tag 340. Master blade 310 puts a tag 341 different from tag 340 in configuration file 331. Tag 341 indicates that configuration file 331 is more recent than configuration file 330. In one embodiment, tag 341 is a time stamp. Tag 341 is a time stamp when master blade 310 creates configuration file 331. Tag 341 is a time stamp later than tag 340, and therefore indicates configuration file 331 is more recent than configuration file 330. In this embodiment, master blade 310 includes a clock (not shown). Master blade 310 obtains the current time from the clock and uses the current time as the time stamp for tag 341. In one embodiment, master blade 310 obtains the current time after receiving the response from slave blade 314 as described above with reference to FIG. 4.

In one embodiment, tag 341 is a number. Tag 341 is a number larger than tag 340 to indicate configuration file 331 is more recent than configuration file 330. For example, tag 341 is an integer, and tag 341 is one larger than tag 340. In one embodiment, master blade 310 obtains tag 340 from configuration file 330 and calculates tag 341 by adding one to tag 340.

In one embodiment, tag 341 is a revision number. Master blade 310 obtains tag 340 from configuration file 330 and calculates a newer revision number based on tag 340. Master blade 310 puts the newer revision number as tag 341.

After master blade 310 creates configuration file 331, master blade 310 informs the slave blades of configuration file 331 in order to synchronize configuration file 331 with the configuration files stored locally by the slave blades. Master blade 310 sends a configuration message 505 to slave blades 312, 314 and 316 to inform them of configuration file 331. In one embodiment, master blade 310 includes tag 341 in configuration message 505. Slave blades 312, 314 and 316 receives configuration message 505 and retrieves tag 341.

In one embodiment, master blade 310 includes configuration file 331 in configuration message 505.

Figure 6:
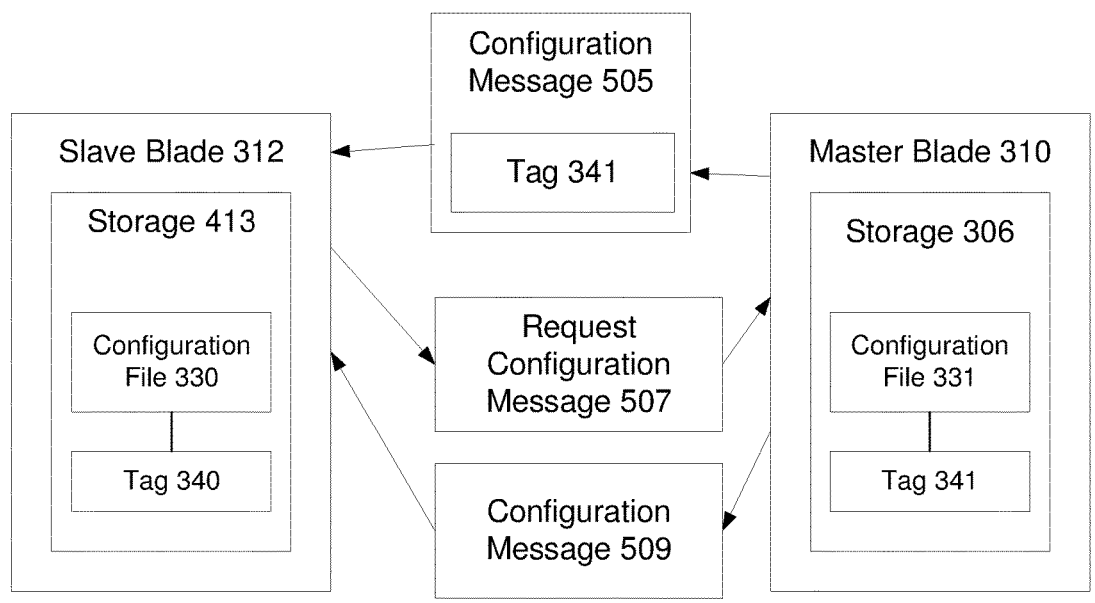
FIG. 6 illustrates a master blade synchronizing an updated configuration file to a slave blade according to an exemplary embodiment.

FIG. 6 illustrates a master blade synchronizing an updated configuration file with a slave blade according to an embodiment of the present invention. Master blade 310 sends configuration message 505 to slave blade 312. Slave blade 312 receives configuration message 505 and retrieves tag 341 from configuration message 505. Slave blade 312 includes storage 413. In one embodiment, storage 413 includes configuration file 330 being the most recent configuration file that slave blade 312 had obtained from a master blade. Configuration file 330 in storage 413 includes tag 340. Upon retrieving tag 341 from configuration message 505, slave blade 312 obtains tag 340 from configuration file 330 in storage 413. Slave blade 312 compares tag 340 and tag 341, and determines that tag 341 is more recent than tag 340. Thus, slave blade 312 determines that there is a more recent configuration file 331 than configuration file 330 in storage 413. In one embodiment, configuration message 505 does not include tag 341. Upon receiving configuration message 505, slave blade 312 sends a request configuration message to master blade 310 for tag 341, and master blade 310 responds with tag 341 using another configuration message.

In response to determining that tag 341 is more recent than tag 340, slave blade 312 sends a request configuration message 507 to master blade 310 to request a configuration file. In one embodiment, slave blade 312 places tag 341 in request configuration message 507. Master blade 310 receives the request configuration message 507 and retrieves tag 341. Master blade 310 finds a match of tag 341 from configuration message 507 against tag 341 from configuration file 331 in storage 306. Master blade 310 sends configuration file 331 to blade 312. In one embodiment, master blade 310 sends configuration file 331 in a configuration message 509 to slave blade 312. In one embodiment, master blade 310 sends configuration file 331 using a separate file transfer communication session with slave blade 312.

In one embodiment, request configuration message 507 does not include tag 341. After receiving request configuration message 507, master blade 310 automatically sends the most recent configuration file, say configuration file 331, to slave blade 312.

After receiving configuration file 331 from configuration message 509 or a file transfer communication session, slave blade 312 stores configuration file 331 and tag 341 into storage 413 of blade 312. In various embodiments, slave blade 312 replaces configuration file 330 by configuration file 331, or stores configuration file 330 in a different location or using a different file name in storage 413. Configuration file 331 becomes the most recent configuration file for slave blade 312.

In one embodiment, master blade 310 has a configuration file more recent than configuration file 331. For example, between the sending of the configuration message 505 by the master blade 310 and the sending of the reply configuration message 507 by the slave blade 312, another configuration command may have been received from the host 100, resulting in a further configuration change. In this case, master blade 310 sends the more recent configuration file to slave blade 312, despite the fact that slave blade 312 asked for configuration file 331 corresponding to tag 341.

In one embodiment, master blade 310 sends configuration message 502 about tag 341 more than once. In this way, slave blade 312 will receive at least one copy of the configuration message 502 in case slave blade 312 fails to receive the other copies of configuration message 502. In one embodiment, master blade 310 sends configuration message 502 periodically, such as once every 30 seconds, 1 second, 5 minutes, or 100 milliseconds.

Figure 7:
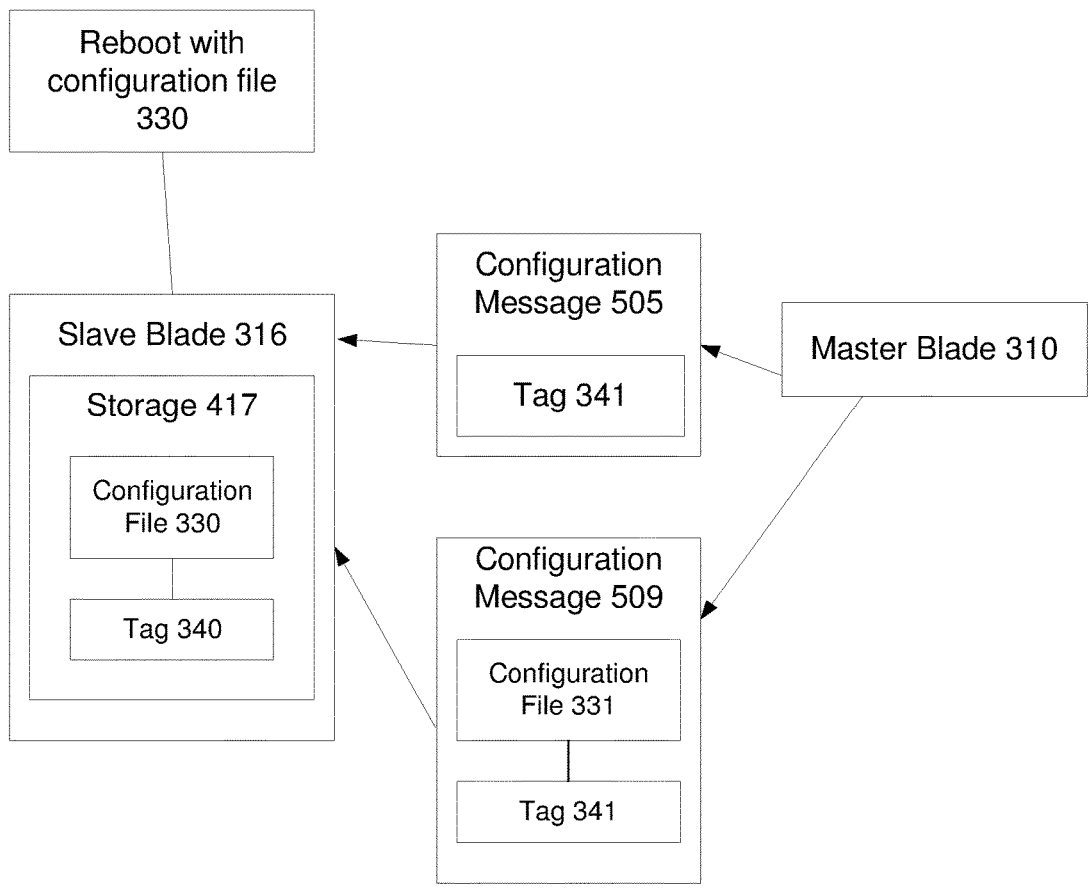
FIG. 7 illustrates a new slave blade synchronizing a configuration file in the process of joining the virtual application distribution chassis according to an exemplary embodiment.

FIG. 7 illustrates a new slave blade synchronizing a configuration file in the process of joining the virtual application distribution chassis according to an embodiment of the present invention. Slave blade 316, a blade of virtual application distribution chassis 300, re-joins virtual application distribution chassis 300. Slave blade 316 may have failed while master blade 310 was processing configuration command 113. Slave blade 316 becomes available and re-joins virtual application distribution chassis 300. Slave blade 316 includes storage 417 with the configuration file 330 stored in the storage 417. In one embodiment, slave blade 316 obtains configuration file 330 as the most recent configuration file received earlier from a master blade such as master blade 310. Slave blade 316 retrieves configuration file 330 from storage 417 and applies the plurality of configuration commands in configuration file 330. Slave blade 316 joins virtual application distribution chassis 300 with a blade configuration associated to configuration file 330.

Slave blade 316 receives configuration message 505 from master blade 310, and retrieves tag 341 from configuration message 505. Slave blade 316 compares tag 341 with tag 340 of configuration file 330 in storage 417. Slave blade 316 determines tag 341 is more recent than tag 340. Slave blade 316 obtains configuration file 331 from master blade 310, as described above with reference to FIG. 6.

Once slave blade 316 obtains configuration file 331, slave blade 316 applies configuration commands in configuration file 331. In one embodiment, slave blade 316 resets itself to clear the configuration based on configuration file 330. After slave blade 316 is reset, slave blade 316 finds configuration file 331 in storage module 416 and applies configuration commands in configuration file 331. In one embodiment, slave blade 316 applies configuration commands in configuration file 331 without clearing the configuration based on the configuration commands in configuration file 330. In one embodiment, slave blade 316 undoes configuration commands based on configuration file 330, and applies configuration commands in configuration file 331.

After slave blade 316 applies configuration commands in configuration file 331, slave blade 316 rejoins virtual application distribution chassis 300. When slave blade 316 receives configuration message 502 and obtains tag 341 from configuration message 505, slave blade 316 compares tag 341 of configuration message 505 with tag 341 from configuration file 331 in storage module 416. Slave blade 316 determines the two tags are the same and configuration file 331 is the most recent configuration file indicated by master blade 310.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for synchronizing configuration files by a master blade of a virtual application distribution chassis comprising a plurality of blades, the method comprising:
   processing a configuration command received from an administrative host by the master blade;
   determining that the received configuration command applies changes to at least one network application implemented by one or more blades of the virtual application distribution chassis;
   updating a first configuration file comprising a plurality of configuration commands and generating an updated tag associated with the updated first configuration file, the updated first configuration file comprising the received configuration command;
   sending a first configuration message to one or more slave blades of the plurality of blades informing of the updated configuration file in response to receiving the configuration command by the administrative host;
   in response to the first configuration message informing the one or more slave blades of the updated configuration file, receiving a request for the updated first configuration file from at least one slave blade; and
   sending a second configuration message comprising the updated first configuration file and updated tag, the updated first configuration file comprising the plurality of configuration commands of the first configuration file and the received configuration command.

2. The method of claim 1, wherein the first configuration message comprises the updated tag.

3. The method of claim 1, wherein the request for the updated configuration file from at least one slave blade comprises the updated tag.

4. The method of claim 1, further comprising receiving a reply configuration message by at least one slave blade indicating that the configuration command was applied by the slave blade.

5. The method of claim 1, wherein the processing a configuration command received from an administrative host by the master blade comprises identifying at least one slave blade from the plurality of blades in the virtual application distribution chassis for the configuration command.

6. The method of claim 1, wherein the updated tag is a time stamp.

7. The method of claim 1, wherein the updated tag is an integer.

8. The method of claim 1, wherein the updated tag is a revision number.

9. The method of claim 1, wherein the master blade of the virtual application distribution chassis is a server load balancer.

10. The method of claim 1, wherein the master blade of the virtual application distribution chassis is an application delivery controller.

11. A non-transitory computer readable storage medium having embodied thereon a computer readable program, wherein the computer readable program when executed by one or more processors performs a method comprising:
   processing a configuration command received from an administrative host by a master blade;
   determining that the received configuration command applies changes to at least one network application implemented by one or more blades of the virtual application distribution chassis;
   updating a first configuration file comprising a plurality of configuration commands and generating an updated tag associated with the updated first configuration file, the updated first configuration file comprising the received configuration command;
   sending a first configuration message to one or more slave blades of the plurality of blades informing of the updated configuration file in response to receiving the configuration command by the administrative host;
   in response to the first configuration message informing the one or more slave blades of the updated configuration file, receiving a request for the updated first configuration file from at least one slave blade; and
   sending a second configuration message comprising the updated first configuration file and updated tag, the updated first configuration file comprising the plurality of configuration commands of the first configuration file and the received configuration command.

12. A system, comprising:
   a plurality of blades operatively coupled as a virtual application distribution chassis within a data network, wherein each blade comprises a processor and a non-transitory computer readable storage medium having a computer readable program, the computer readable program when executed by the processor causes a master blade of the plurality of blades to:
   process a configuration command received from an administrative host by the master blade of the plurality of blades of the virtual application distribution chassis;
   determine that the received configuration command applies changes to at least one network application implemented by one or more blades of the virtual application distribution chassis;
   update a first configuration file comprising a plurality of configuration commands and generate an updated tag associated with the updated first configuration file, the updated first configuration file comprising the received configuration command;
   send a first configuration message to one or more slave blades of the plurality of blades informing of the updated configuration file in response to receiving the configuration command by the administrative host;
   in response to the first configuration message informing the one or more slave blades of the updated configuration file, receive a request for the updated first configuration file from at least one slave blade; and
   send a second configuration message comprising the updated first configuration file and updated tag, the updated first configuration file comprising the plurality of configuration commands of the first configuration file and the received configuration command.

13. The system of claim 12, wherein the first configuration message comprises the updated tag.

14. The system of claim 12, wherein the request for the updated configuration file from at least one slave blade comprises the updated tag.

15. The system of claim 12, further comprising receive a reply configuration message by at least one slave blade indicating that the configuration command was applied by the slave blade.

16. The system of claim 12, wherein the process a configuration command received from an administrative host by the master blade comprises identifying at least one slave blade from the plurality of blades in the virtual application distribution chassis for the configuration command.

17. The system of claim 12, wherein the updated tag is a time stamp.

18. The system of claim 12, wherein the updated tag is an integer.

19. The system of claim 12, wherein the updated tag is a revision number.

20. The system of claim 12, wherein the master blade of the virtual application distribution chassis is a server load balancer.

* * * * *